Feb. 10, 1942.                S. Q. SHANNON                2,272,531
                               PISTON RING
                            Filed June 12, 1939
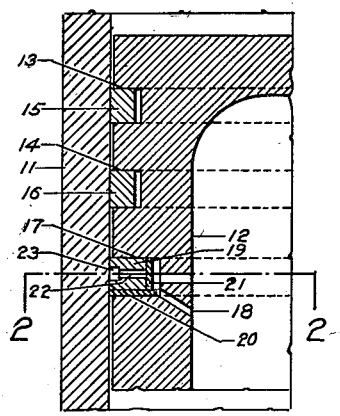
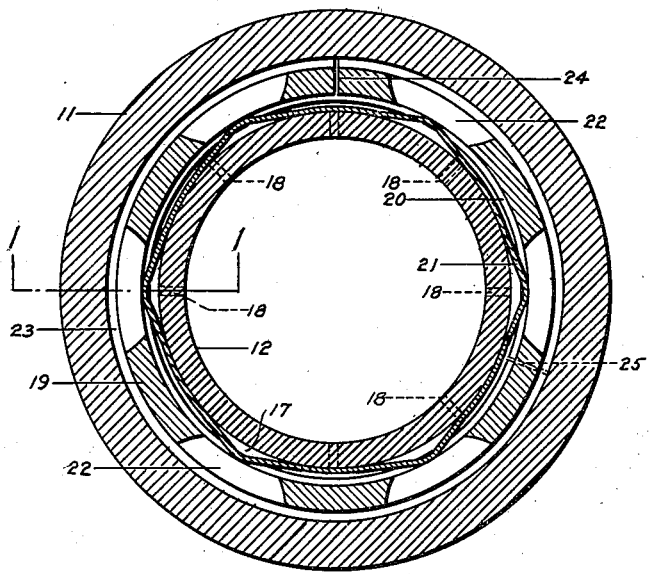
Fig. 1.            Fig. 2.
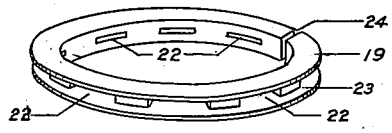
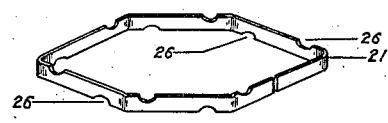
Fig. 3.            Fig. 4.
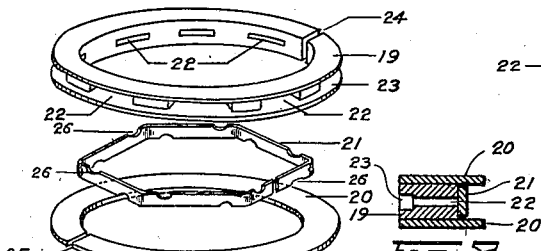
Fig. 5.    Fig. 8.    Fig. 6.
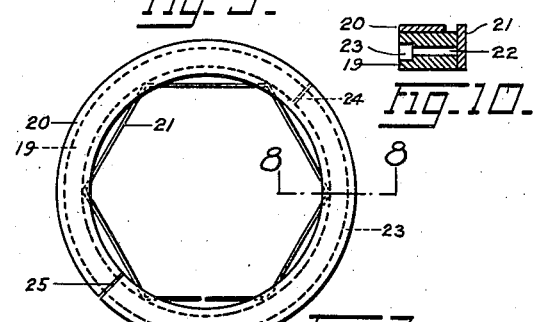
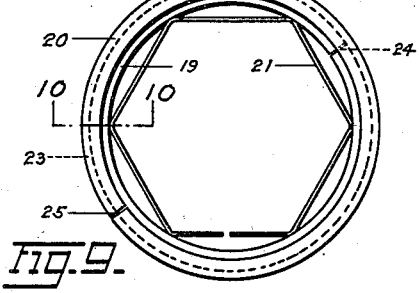
Fig. 10.
Fig. 7.    Fig. 9.
S. Q. SHANNON
            INVENTOR.
BY
            ATTORNEY.

Patented Feb. 10, 1942

2,272,531

UNITED STATES PATENT OFFICE 2,272,531

PISTON RING

S. Q. Shannon, Los Angeles, Calif.

Application June 12, 1939, Serial No. 278,633

4 Claims. (Cl. 309—45)

This invention relates to piston rings, and in particular to composite lubrication control rings.

The object of the invention is to provide an improved piston ring assembly which effectively seals the piston in the cylinder and controls the lubrication between the surfaces. Another object is to provide a piston ring assembly which "wears in" quickly but which functions uniformly and effectively over a long period.

Other objects will be apparent from the description of preferred embodiments of my invention, as illustrated in the accompanying drawing, in which Fig. 1 is a fragmentary longitudinal section on the line 1—1 of Fig. 2 of a cylinder and piston provided with a ring assembly embodying the features of my invention;

Fig. 2 is a section on line 2—2 of Fig. 1;

Fig. 3 is a perspective view of a vented ring element of my ring assembly;

Fig. 4 is a perspective view of an expander spring member of my ring assembly;

Fig. 5 is a perspective view of the elements of a preferred assembly in separated relation;

Fig. 6 is a modified form of vented ring;

Fig. 7 is a plan view of a modified assembly of a vented ring interposed between two thin flat ring members;

Fig. 8 is a section taken on the line 8—8 of Fig. 7;

Fig. 9 is a plan view of another modified assembly;

Fig. 10 is a section taken on the line 10—10 of Fig. 9.

Referring particularly to Figs. 1 and 2, portions of a cylinder 11 of an internal combustion engine, with its piston 12 are shown. The piston is provided with grooves 13 and 14 in which conventional type compression rings 15 and 16 are represented, to show the usual arrangement of parts in relation to the oil ring piston groove 17, which is provided with an oil drain passage 18. My improved piston ring assembly is shown in groove 17 as an expansible vented ring 19, a thin flat split ring member 20, and an expander spring member 21 pressing outwardly only against the vented ring 19.

The vented ring 19 is preferably made of cast iron, and provided with vents or passages 22 to convey any lubricant which may be collected from the cylinder wall to the interior of the ring groove and then out through the oil drain passage 18. As shown, a peripheral channel 23 is provided on the cylinder contact face of the vented ring 19, which serves to collect the excess lubricant into a common conduit connected with all of the vents 22. The vented ring 19 is expansible, being split at 24. Any suitable form of vented ring may be used, another form being shown in Fig. 6.

The vented ring member 19 and the thin flat ring member 20 together are of such thickness that they closely fit the piston groove 17, but are free to expand and contract to closely fit the cylinder wall as the piston moves. The flat ring member 20 is preferably made of flat steel stock rolled edgewise, and of radial thickness somewhat greater than the radial thickness of the vented ring member 19. The thin ring member 20 is split, as shown at 25, and is so formed that when in position in the piston, it is under circumferential compression, and presses outwardly against the cylinder wall with considerable pressure by its own springiness, and this pressure may be varied in the forming operations to give any desired unit pressure of the edge contact with the cylinder wall. The expander spring member 21 is supported in edge-sliding contact on a flat side of the thin ring member 20, and presses outwardly only against the inner surface of the vented ring member 19. This expander spring member 21 as represented is of a commonly used sinuously bent type, which when confined in the annular space between the vented ring member and the inner surface or "bottom" of the piston groove, provides a series of spring portions forcing the vented ring outwardly against the cylinder wall. Edge openings 26 in the expander 21 are provided for passage of lubricant. The vented ring 19, when made of cast iron, which is the preferred material because of its softer action in contact with the cylinder, is less resilient than is the thin ring member 20 made of steel ribbon, and the provision of the expander spring 21 to operate only against the vented ring gives more uniform contact and wear. By providing a vented ring having either a larger or smaller internal radial diameter than the thin ring member, the expander spring presses only upon the vented ring. When the thin ring is of larger internal diameter, as shown in the preferred form of Figs. 1 to 5, the additional advantage is gained in providing an edge-sliding bearing for the expander spring on the inner exposed face of the thin ring, which prevents excessive wear on the piston ring groove, and also avoids any possibility of binding between the parts with subsequent loss of independence of expansion and contraction to conform to the cylinder walls. When the thin ring member 20 is less in internal diameter than the vented ring member 19, as shown in Figs. 9 and 10, an expander spring member 21 as wide as the ring groove may be used, with the advantage of longer life and greater expanding pressure against the vented ring member 19.

While I prefer to use an assembly of a single thin ring member, with the thicker vented ring and the expander spring acting thereon, other combinations or assemblies may be used according to my invention, the one shown in Figs. 7 and 8 having two thin ring members 20 between which is a vented ring member 19 of lesser internal radial diameter that the thin rings, together with an expander spring member 21, which has an edge bearing contact on both thin ring surfaces where they are exposed. This assembly may be used advantageously to control surface lubrication and to prevent "blow-by" with worn or irregular cylinder walls, and is durable because there is no danger of binding between the parts, and the expander spring exerts its entire force against the full width of the vented member.

The advantages of my ring assemblies will be apparent to those skilled in the art, and while I have described and illustrated preferred forms, my invention is not limited thereto, but is restricted only insofar as required by the prior art and by the spirit of the appended claims.

I claim:

1. A piston ring assembly comprising a thin self-expanding cylinder-contacting ring member having flat surfaces for contacting the piston groove walls and the surface of an adjacent ring member, a thicker vented ring member adjacent thereto having an inside radial diameter greater than said thin ring member, and an expander spring member adapted to slidably bear upon the flat surface of said thin ring member not in contact with said vented ring member and to press outwardly against said vented ring member only.

2. A piston ring assembly comprising a pair of thin self-expanding cylinder-contacting ring members having flat surfaces, a thicker vented ring member therebetween having an inside radial diameter greater than said thin ring members, and an expander spring member slidably bearing upon the inner flat surfaces of said thin ring members not in contact with said vented ring member and adapted to press outwardly against said vented ring member only.

3. A piston ring assembly comprising a self-expanding thin steel cylinder-contacting ring member having flat surfaces for contacting the piston groove walls and the surface of an adjacent ring member, a vented expansible cast-iron ring member adjacent thereto, and an expander spring member for said cast iron member slidably bearing on the inner flat surface of said steel ring member.

4. A piston ring assembly comprising a pair of self-expanding thin steel cylinder-contacting ring members, a cast-iron vented ring member therebetween of greater inside diameter than said steel members, and an expander spring member slidably bearing against the inner flat surfaces of said steel ring members not in contact with said vented ring member while exerting expander pressure against said cast iron member only.

S. Q. SHANNON.